Figure 1:
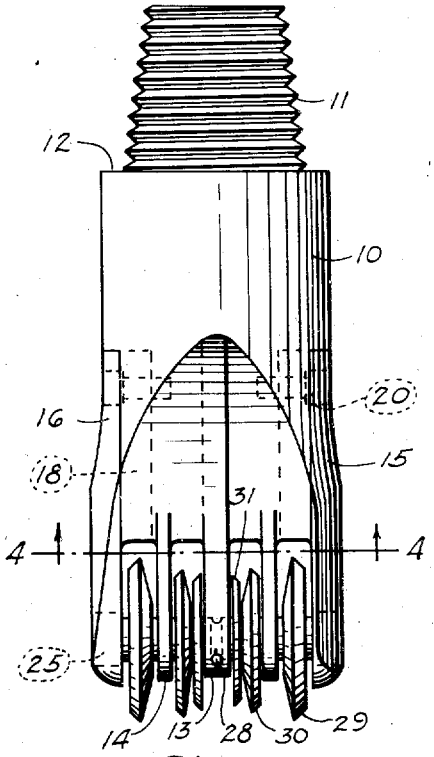

Nov. 11, 1930. I. C. BELL Re. 17,856

MULTIPLE CUTTER DISK BIT

Original Filed Nov. 12, 1924 3 Sheets-Sheet 1

INVENTOR.
I. C. Bell

BY

ATTORNEY.

Nov. 11, 1930. I. C. BELL Re. 17,856

MULTIPLE CUTTER DISK BIT

Original Filed Nov. 12, 1924 3 Sheets-Sheet 2

INVENTOR.
I. C. Bell

BY Jack N. Ashley

ATTORNEY.

Nov. 11, 1930. I. C. BELL Re. 17,856

MULTIPLE CUTTER DISK BIT

Original Filed Nov. 12, 1924 3 Sheets-Sheet 3

INVENTOR.
I. C. Bell

BY

ATTORNEY.

Reissued Nov. 11, 1930

Re. 17,856

UNITED STATES PATENT OFFICE

IVAN C. BELL, OF DALLAS, TEXAS, ASSIGNOR TO THE GUIBERSON CORPORATION, OF DALLAS, TEXAS, A CORPORATION OF DELAWARE

MULTIPLE-CUTTER-DISK BIT

Original No. 1,657,604, dated January 31, 1928, Serial No. 749,547, filed November 12, 1924. Application for reissue filed May 7, 1929. Serial No. 361,227.

This invention relates to new and useful improvements in multiple cutter disk-bits.

The object of the invention is to provide a drill bit for rotary well drilling which will cut or drill through various formations such as rock, both hard and soft, shale, gumbo and other strata, at a comparatively high rate of speed, due to a plurality of peculiarly arranged rolling cutter disks, and which will make more hole in a given length of time than those drill bits now in common use.

A further object of the invention is to provide a bit having a plurality of rolling cutter disks so loosely mounted as to wobble or oscillate, or mounted to shift laterally on their supports; whereby said disks not only out or drill more efficiently but are self-sharpening while rolling and cutting, thus constantly performing at maximum efficiency; and further whereby grease and oil lubrication is eliminated and the disks are also made non-clogging.

Another object is to arrange the disks in stepped order on opposite sides of the center of the drill, the disks preferably increasing in diameter outwardly, whereby the bottom of the hole is crowned, which causes the drill to be self-centering and this makes for straight drilling.

A still further object of the invention is to provide a multiple disk drill which may be constructed in a sturdy and strong manner as well as economically and which will have a long life as compared with the bits now in use.

A particular object is to provide a head of such design that it will provide amplified bearings for the disks and an efficient arrangement of water passages.

One of the improved features resides in the provision of removable and replaceable supports for the axles so that the cutters may be replaced when worn.

Another improvement is to provide replaceable portions on opposite sides of the bit at the points under-going the greatest wear.

A still further improvement resides in inwardly movable cutter disks having ample play to shift laterally and reduce the diameter of the bit sufficiently to pass through a casing and then shift outwardly to underream the casing.

Another improvement is to mount a pair of cutter disks in the same yoke and loosely upon the axle and properly spaced apart, whereby wobbling and self-sharpening disks may be mounted in close relation and within a short radius from the center of the bit.

An important object of the invention is to mount the disks on axles which are disposed longitudinally on opposite sides of the transverse axis of the bit body whereby the disks are caused to drag as well as roll during the rotation of the bit.

A construction designed to illustrate the invention together with novel features involved therein will be hereinafter more particularly described.

Figure 2:
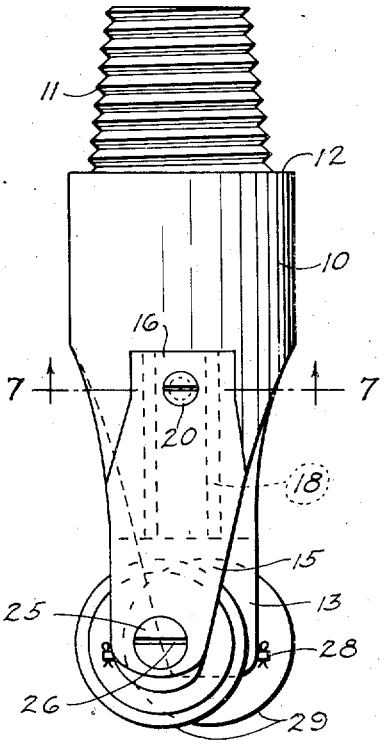
Figure 3:
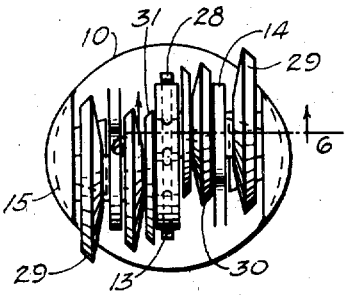
Figure 4:
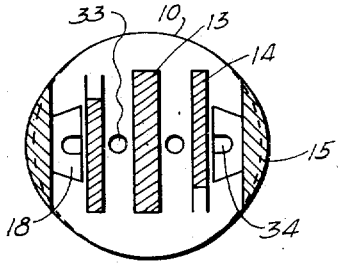
Figure 5:
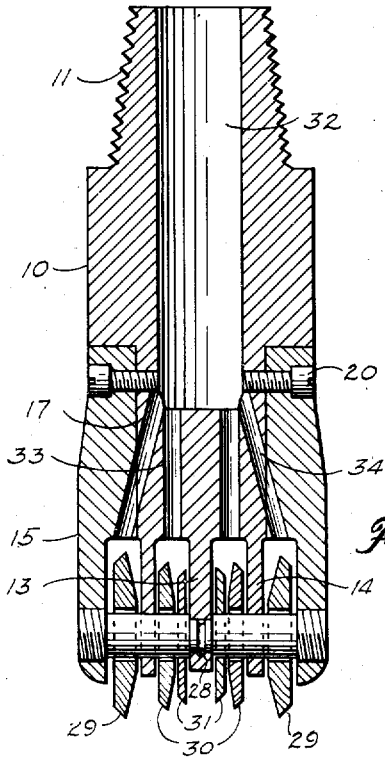
Figure 7:
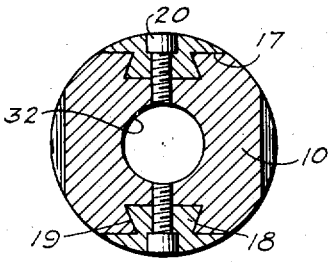
Figure 8:
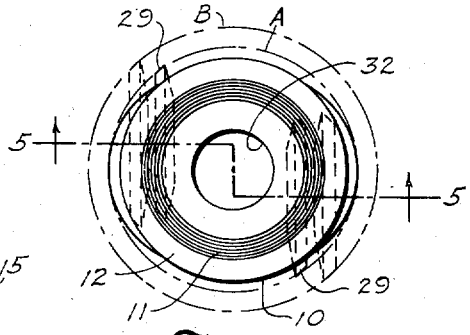
Figure 6:
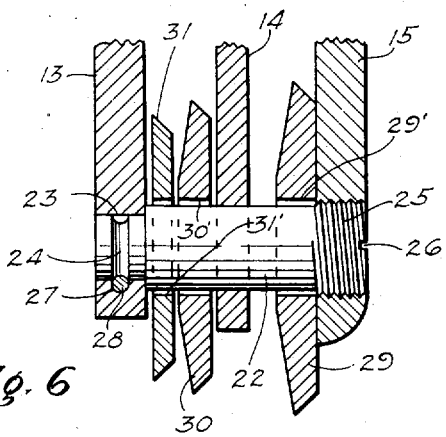
Figure 9:
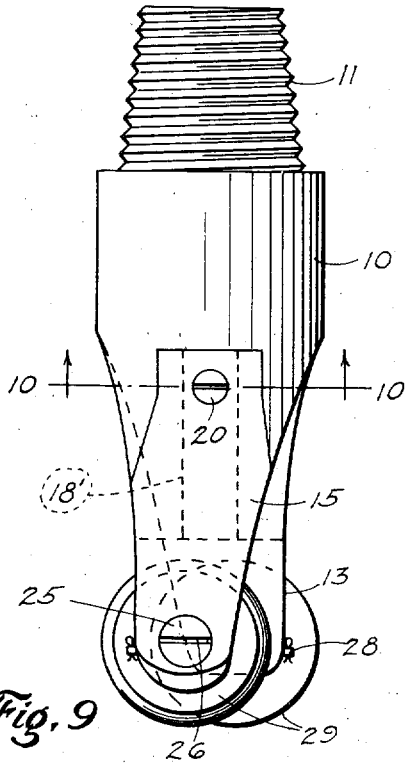
Figure 11:
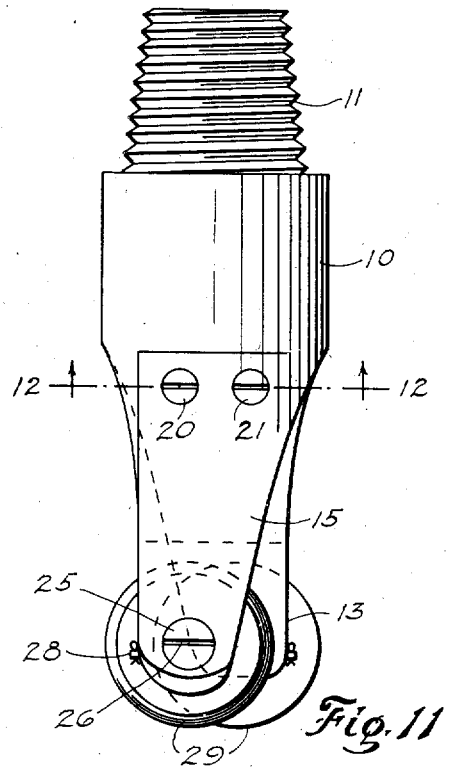
Figure 10:
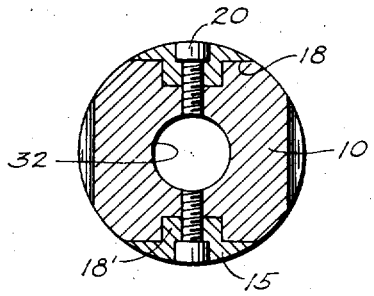
Figure 12:
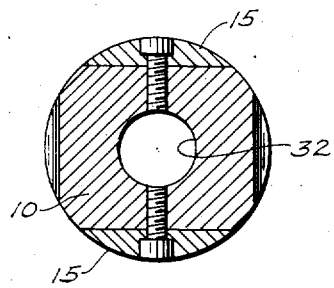

The invention will be more readily understood from a reading of the following specification and by reference to the accompanying drawings, in which examples are shown and wherein:

Figure 1 is a front elevation of a bit constructed in accordance with my invention, Figure 2 is a side elevation, of the same, Figure 3 is an underside view, Figure 4 is a cross-sectional view taken on the line 4—4 of Figure 1, Figure 5 is a transverse vertical sectional view taken on the line 5—5 of Figure 8, Figure 6 is an enlarged sectional view on the line 6—6 of Figure 3, Figure 7 is a cross-sectional view taken on the line 7—7 of Figure 2, Figure 8 is a plan view, Figure 9 is an elevation of a modified form of the bit, Figure 10 is a cross-sectional view taken on the line 10—10 of Figure 9, Figure 11 is an elevation of another form of bit structure, and Figure 12 is a cross-sectional view taken on the line 12—12 of Figure 11.

This application is in part a continuation of my former application filed May 31st, 1924, Serial No. 716,970.

In the drawings the numeral 10 designates a bit body or stock having a reduced tapered pin 11 or any other drill stem connection at its upper end. The pin is surrounded by an outwardly directed shoulder 12. The upper portion of the stock is cylindrical, although this is merely a preferred design. A web or tongue 13 is provided at the bottom of the stock and extends diametrically of the same. The vertical edges of the web are curved or flared upwardly to the circumference of the stock.

On each side of the web reduced flat bosses or standards 14 are built up and disposed in offset relation to each other and parallel to the web. The standards are spaced from the web. Complementary to the standards and spaced therefrom and cheek plates or wings 15 having shanks 16 at their upper ends. The stock has shouldered flat seats 17 on each side (Figure 7) for receiving the shanks which have their outer surfaces shaped to conform to the contour of the stock. The lower portions of the plates are offset outwardly and sustain the wear when the bit is rotated.

Each plate has a vertical central key 18 on the inner side or face of its shank fitting in a keyway 19 in the seat 17. The key and key-way may be dove-tailed or as is shown in Figs. 9 and 10 they may be right angular as at 18′ and 19′. The keys prevent displacement of the plates and take the shearing strain of the latter.

It is obvious that the plates may be attached in any suitable manner. The shanks are preferably fastened, each by a screw 20 entering the stock radially. However the plates may assume any desirable form and may be fastened to the stock in any suitable manner. For instance in Figures 11 and 12 the key is omitted and a second screw 21 is added for fastening the plate in place.

The lower portion of each plate is flared to conform to its complementary standard 14 and supports the outer end of an axle 22. Each axle passes through the adjacent standard and has its inner end reduced and resting in the aperture 23 in the web. The reduced end of each axle has a circumferential groove 24. The shouldered end of the axle abuts the flat side of the web. Each axle may have its outer end or head 25 screw-threaded to engage in a screw-threaded aperture in the lower end of the plate, or it may be fastened in any other suitable manner. The head when screw-threaded is provided with a kerf 26 for a screw driver or other tool. The web 13 has a longitudinal bore 27 intersecting the bottoms of the apertures 23 to receive a pin 28 which engages in the grooves 24, and locks the axles in place. The pin may be suitably fastened as by cotter keys 27′ passing through the end. The dominating feature of the invention is a plurality of cutter disks loosely mounted on the axles so as to undergo lateral or radial movement relatively of the bit stock as well as vertical or radial movement relatively of the axles. Such freedom and amplitude of movement permits the disks to wobble as they are rotated during the rotation of the bit. Also by this mounting each disk is free to move from a plane substantially parallel to the vertical axis of the body 10 to a plane at an angle to said axis.

Such a mounting of the disks has many advantages. For instance they are self-sharpening and readily roll, thus securing traction and obviating peripheral roughening or fluting. They do not need grease or oil lubrication and will not clog up. In the drawings I have shown three disks 29, 30 and 31 and respectively, mounted on each axle. The outer disk 29 of each axle assembly is the largest, but is not as large as the disks usually employed on disk bits for boring the same diameter of hole. In fact better results have been obtained by the smaller disks, but the size and number of disks is subject to variation.

Each disk 29 is mounted on the axle between the standard 14 and the cheek plate 15 and is thickest at its hub portion; being reduced or inclined on one side toward its outer edge which is bevelled in the opposite direction, so as to flare from the plate. The space between each plate and its complementary standard is considerably greater than the thickness of the disk 29. This permits the disk to move laterally on its axle or radially of the bit on the axle. The disk has a central aperture 29′ larger than the diameter of the axle, whereby the disk may move radially of the axle and may deflect or tilt from its normal vertical plane while rotating, thus wobbling or canting on its axle.

Between the web 13 and each standard 14 the disks 30 and 31 are mounted. The disk 30 has a central aperture 30′ and is otherwise the same as the disk 29, except that it is smaller in diameter. Each disk 31 is made flat on both sides and of constant thickness, but this is subject to variation. The thickened hub and inclined side of the disk 30 spaces the surfaces apart. The disk 31 has an enlarged central aperture 31′. The disks 30 and 31 have ample play along the axle between the web and standard. By mounting the disks 30 and 31 as described they are disposed close to the center of the bit and thus cut within a shorter radius than if they were separated by a support therebetween.

A well 32 is bored axially in the pin 11 and stock 10. Water ducts 33 are counterbored from the bottom of the well through the stock (Figure 3) so as to discharge between the web and standards over the disks 30 and 31. Additional ducts 34 are counterbored through the stock and cheek plates to discharge over the disks 29. It will be seen that the disks are copiously supplied with water or slush and are adequately washed.

Sufficient use of this bit has been made to demonstrate its advantages and to establish it as a continuous drilling tool. The radially or laterally movable and wobbling disks cut through rock, shale and sand as well as they do through gumbo and other formations. Due to the wobbling of the disks and the adequate washing, nothing lodges between the disks and they do not clog. Further they rotate freely, thus wearing evenly and maintaining their bevel and sharp edges.

As is shown in Figure 8, the outer disks, 29 may be slid inward to lie within the circle A and thus reduce the diameter so as to pass down through the casing. When the bit is lowered below the casing the disks 29 will ride outward to the circle B, thus increasing the diameter and underreaming the casing when the bit is rotated. The disks increasing in diameter outwardly of the bit will cause a slight crown on the bottom of the hole, thus centering the bit and making a straight hole.

It will be clearly seen that the wear will be sustained by the disks and the cheek plates 15, the stock being thus protected. When the plates and disks are worn so as to be inefficient, the screws 20 and the pin 28 are removed and the axles 22 are unscrewed; whereby the disks may be taken out. After the axles are removed the cheek plates 15 may be removed. These parts may be replaced at a small cost.

As before stated the bores of the disks are made larger than the diameters of the axles, so that instead of having merely a turning fit and the play usually present, the clearance or play between the journal of each disk and its axle is such as to initially give the disk a very loose fit and a lateral or vertical movement or both, relative to the axle. This results in an amplified wobble, oscillation or shifting of the disk which is most prominent at its periphery and also causes the disk to rotate freely. The disk thus becomes self-sharpening and this sharpening is enhanced by the shearing action of the edge of the disk, due to wobble, oscillation or shift. The amplified movement not only makes for sharpening and the retaining of the circular edge, but causes faster cutting due to the shearing action.

In further explanation, it may be stated after numerous tests by actual drilling, that the disks traversing circuitous or sinuous paths rather than regular circular paths and being under the downward pressure of the superimposed drill stem, not only cover a greater transverse area in their travel by peripheral contact with the bottom of the hole, but have a very effective self-sharpening action, due to the wobble, the lead or offset of the disks from the transverse axis of the bit body and the weight placed upon the disks. It is obvious that such disks will tend to chip off the rock and shale and will cut faster by keeping a sharp edge.

Comparison may be made with a lathe tool. If a piece of tool steel for instance was placed in a lathe tool holder and fed against a piece of work, in time, due to wear, the tool would develop a sharp edge on its upper face, but the whole end face of the tool would be in contact with the work, it would therefore do very little cutting; however, if the end face of the tool was cut back at an angle from the cutting edge, then the tool would cut fast and properly.

This same condition applies to a revolving cutting disk, and more so if the disk fails to revolve, because if the vertical plane of the disk is held true and at a constant distance from the center or vertical axis of the rotating bit, the cutting edge or periphery of the disk will naturally wear, but the whole cross area of the disk periphery will be in contact, at the cutting arc, with the formation; thus wearing so flat or so near a right angle to the side of the disk, as not to do much cutting. However, if the disk is mounted free enough to easily revolve and so that its periphery will shift transversely across its cutting arc, there will be a much greater wearing across the area of the periphery. By this the disk will be worn to a more acute angle back from its cutting edge and the same relief or wear at the heel of the cutting face, will be had as is given to a lathe tool.

While the wobbling action presents certain advantages in the specific development of the invention, the relative location of the disks and the mounting of disks at the center and outer portions is equally as important.

By maintaining a sharp cutting edge, by traversing a greater path and by moving transversely of its cutting arc, the disk cuts faster. A continuous drilling bit which goes through hard as well as soft formations without changing bits, whereas it has been necessary heretofore to come out of the hole and change bits because of the hard and soft formations, is of great advantage, as will be appreciated by the driller. The offsetting of the axles with relation to the transverse axis of the bit is very important as this gives the disks a drag and adds to their cutting action. The central disks are also very effective in cutting out the core. Such cutting action is due to the relation of the axles to the axis of the bit and the disposition of the rotating disks upon the axles, so that a wobbling or lateral movement of the disk is not required, and they may be otherwise mounted on the axles.

Various changes in the size and shape of the different parts, as well as modifications and alterations may be made within the scope of the appended claims.

What I claim, is:

1. In a multiple cutter disk bit, a bit body, axles mounted transversely of the body in offset relation, cutter disks initially loosely mounted on said axles and movable laterally when rotating, and supports for the outer ends of the axles.

2. In a multiple cutter disk bit, a bit body, axles mounted transversely of the body in offset relation, cutter disks initially loosely mounted on said axles and movable laterally and also in a vertical plane, and supports for the outer ends of the axles.

3. In a multiple cutter disk bit, a bit body, a plurality of cutter disks initially mounted to wobble when the bit is rotated, and cheek members confining the disks and taking the wear off the bit body, 4. In a multiple cutter disk bit, a bit body, a plurality of freely rotatable disks mounted on the body with their peripheries initially having an amplified transverse movement relatively of their arcs of cutting contact, and outer wear members confining the disks and fastened to the body.

5. In a multiple cutter disk bit, a stock, wear members on each side of the stock, transverse axles carried by the stock and the bit, and a plurality of cutter disks initially mounted to wobble on said axles between said wear members.

6. In a multiple cutter disk bit, a stock having a drill connection at its upper end, supports depending from the lower end of the stock, the outer supports being removable, axles carried by the supports, and cutter disks loosely mounted on the axles between the supports, said disks having a hub-thickness less than the spaces between the supports, whereby said disks are free to shift laterally at their peripheries and are self-sharpening.

7. In a multiple cutter disk bit, a bit stock, supports at the lower end of the stock wear members at the outer sides of the stock, axles carried by the supports and members, cutter disks initially loosely mounted on the axles so as to wobble, and water ducts extending through the stock and discharging over the disks.

8. In a multiple cutter disk bit, a bit stock having diametrically opposite seats, cheek plates having shanks, means for fastening the shanks of the plates to the seats, supports depending from the bottom of the stock and spaced apart between the plates, axles secured in the supports and plates, and a plurality of cutter disks initially loosely mounted on the axles and movable laterally and vertically.

9. In a multiple cutter disk bit, a cylindrical bit stock having diametrically opposite seats, a transverse web at the bottom of the stock, cheek plates fitting on the seats, standards between the web and plates, axles passing through the standards and having one end in the web and the outer ends in the plates, means for fastening the axles in the web, and a plurality of cutter disks mounted loosely to wobble on the axles between the web and standards and between the standards and the plates.

10. In a multiple cutter disk bit, a cylindrical bit stock having diametrically opposite seats, a transverse web at the bottom of the stock, cheek plates fitting on the seats, standards between the web and plates, axles passing through the standards and having one end in the web and the outer ends in the plates, means for fastening the axles in the web, and a plurality of cutter disks mounted loosely to wobble on the axles between the web and standards and between the standards and the plates, the outermost disks being of greater diameter and movable inwardly to reduce the diameter of the bit.

11. In a multiple cutter disk bit, the combination with a bit body having spaced supports and a transverse axle extending between said supports, of a cutter disk mounted on said axle between said supports and having a central aperture larger than said axle so as to move transversely of the axle, said disk being considerably less in thickness than the space between the supports so as to move longitudinally of the axle, said disk having one side inclined and its cutting edge bevelled.

12. In a multiple cutter disk bit, a bit body, axles mounted transversely of the body in offset relation, cutter disks loosely mounted on said axles and movable laterally and in a vertical plane, removable supports for the outer ends of the axles, and water ducts extending through the bit body and discharging over the disks.

13. In a multiple cutter disk bit, a bit body, a plurality of cutter disks initially mounted to wobble when the bit is rotated, cheek members confining the disks and taking the wear of the bit body, and water ducts extending through the bit body and discharging over the disks.

14. In a multiple cutter disk bit, a stock having a central water well, a tool connection at the top of the stock, vertical seats on opposite sides of the stock having keyways therein, cheek plates provided with shanks fitting on the seats and having keys fitting in the keyways, a web depending from the center of the stock, standards in spaced relation between the web and the plates, offset axles extending through the standards and engaging in the web and plates, means for fastening the plates to the stock, and cutter disks mounted on the axles free to move laterally and vertically between the web and supports and between the supports and the plates, whereby said disks wobble when the bit is rotated.

15. In a multiple cutter disk bit, a bit body, and a plurality of rolling cutter disks initially loosely mounted on the body and movable when rotating from a plane substantially parallel to the vertical axis of the bit body into a plane at an angle to the said axis.

16. In a multiple cutter disk bit, a bit body, axles mounted transversely of the body in offset relation, cutter disks having their circumferential surfaces reduced to cutting edges and mounted on the axles initially with sufficient play to wobble and become self-sharpening when rotating, and supports for the outer ends of the axles.

17. In a multiple cutter disk bit, a bit body, axles mounted transversely of the body in offset relation, cutter disks having their circumferential surfaces reduced to cutting edges and mounted on the axles initially with sufficient play to wobble and become self-sharpening when rotating, supports for the outer ends of the axles, and means for removably securing the inner ends of the axles in place.

18. In a multiple cutter disk bit, a body, a central depending support carried by the body, outer depending supports carried by the body relatively on each side of the central support, and rotatable cutter disks journaled on each side of the central support and between the latter and the outer supports, said disks being mounted initially with sufficient play at their journals to wobble while rotating and to be self-sharpening.

19. In a multiple cutter disk bit, a bit stock, supports at the lower end of the stock, axles carried by the supports, cutter disks mounted and maintained uprightly on the axles and initially free to move laterally on said axles while revolving, and water ducts extending through the stock and discharging over the disks.

20. In a multiple disk drill bit, a head, and a plurality of cutter disks rotatable in the head and initially mounted to wobble relatively of their supports, while rotating.

21. In a multiple disk, drill bit, a head, and a plurality of rotatable cutter disks, said cutter disks being mounted and maintained uprightly and having peripheral faces and initially mounted to move laterally with respect to the head, whereby said faces are sharpened while operating.

22. In a multiple disk drill bit, a head, a central transverse web on the under part of the head, axles extending from opposite sides of the web, and a plurality of rotatable cutter disks mounted and maintained uprightly on said axles and initially free to move laterally.

23. In a multiple disk drill bit, a head, a central transverse web on the under part of the head, axles extending from opposite sides of said web in parallel and offset relation and a plurality of rotatable cutter disks mounted on said axles and initially free to move laterally.

24. In a multiple disk drill bit, a head having a plurality of parallel slots in its under side, and rotatable cutter disks having peripheral faces less in width than the slots, said disks being mounted to initially oscillate as well as to rotate in said slots.

25. In a multiple disk drill bit, a head, and a plurality of rotatable cutter disks on each side of the center of the head mounted to initially oscillate in the head while rotating and each decreasing successively in diameter inwardly toward the center of the head.

26. In a multiple disk drill bit, a head, a plurality of loosely journaled upright cutter disks free to move laterally of their supports to reduce the diameter of the bit and free to move laterally of the head outwardly to increase the diameter of the bit.

27. In a multiple disk bit, a bit body, a pair of rolling upright cutters mounted on opposite sides of the transverse axis of the body and at the central portion of the body, and a second pair of rolling upright cutters also mounted on opposite sides of the transverse axis of the body and outwardly of the first named cutters, the outer cutters depending lower than the inner cutters, all cutters being located at the bottom of the bit body, all of said cutters being initially mounted to shift laterally at their peripheries.

28. In a multiple cutter disk bit, a body, a central support depending from the body, axles extending from opposite sides of said central support and on opposite sides of the transverse axis of the body, outer supports carrying the ends of said axles, and a pair of rolling cutters mounted on each axle, one adjacent the center support and one adjacent the outer support, all of said cutters being journaled on their axles initially with sufficient play and loose enough to wobble when rotating.

29. In a multiple cutter disk bit, a stock having a drill connection at its upper end, supports depending from the lower end of the stock, axles carried by the supports, and cutter disks loosely mounted on the axles between the supports, said disks having a hub-thickness less than the spaces between the supports, whereby said disks are free to shift laterally at their peripheries and are self-sharpening.

30. In a multiple cutter disk bit, a bit stock, supports at the lower end of the stock, axles carried by the supports, cutter disks mounted and maintained uprightly on the axles and initially free to rock on said axles while revolving.

31. In an earth boring disk bit, a bit body, depending supports carried by the body, axles carried by said supports on opposite sides of a transverse axis passing through said supports, so that when said bit is rotated both axles will be at all times in advance of said axis, two disks being journaled on each axle, one of said disks being at the center of the body for cutting out the center of the hole and the other disk on the same axle being spaced outwardly a substantial distance from the inner disk and located to cut the marginal portion of the hole, the outer disks being free from contact with other disks at all points of their peripheries, the body above the disks being vertically elongated and containing ducts for supplying drilling fluid to the disks, all of the disks underlying the body.

32. In a multiple cutter disk bit, the combination with a bit body having spaced supports and a transverse axle extending between said supports, of a plurality of cutter disks having cutting edges and initially freely mounted on said axle to permit axial movement of the cutting edges sufficient to effect self-sharpening thereof by contact with the material acted upon and also whereby said disks are free to cut laterally at their cutting edges.

33. In a multiple cutter disk bit, a bit body extending axially of the bit, a plurality of depending supports carried by the body, one of said supports being at the center of the body and intermediate the other supports, axles extending from opposite sides of the central support and offset from each other on opposite sides of the transverse axis of the bit body, the outer ends of said axles being carried by the outer supports, a plurality of cutter disks mounted on each axle under the bit body, an inner disk being mounted on each axle in close proximity to the central support and an outer disk being mounted thereon adjacent the outer support to rotate in a substantially vertical plane and separated from the adjacent disk at all points by an intervening space.

34. In a multiple cutter disk bit, a bit body extending axially of the bit, a plurality of depending supports carried by the body, one of said supports being at the center of the body and intermediate the other supports, axles extending from opposite sides of the central support and offset from each other on opposite sides of the transverse axis of the bit body, the outer ends of said axles being carried by the outer supports, a plurality of cutter disks mounted on each axle under the bit body, an inner disk being mounted on each axle in close proximity to the central support and an outer disk being mounted thereon adjacent the outer support to rotate in a substantially vertical plane and separated from the adjacent disk at all points by an intervening space, the inner disk being of less diameter than the outer disks.

35. The combination specified in claim 32, with the addition of ducts extending through the bit body adapted to discharge liquid upon the cutters intermediate the supports.

In testimony whereof I affix my signature.

IVAN C. BELL.